Feb. 28, 1967     J. P. A. BELLEFLEUR     3,306,562
SELF-ALIGNING MACHINE LEVELERS
Filed Feb. 15, 1965     2 Sheets-Sheet 1
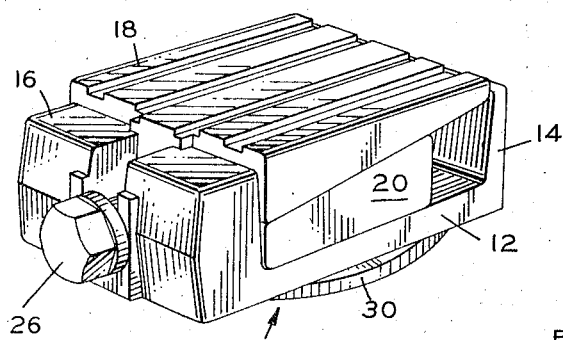
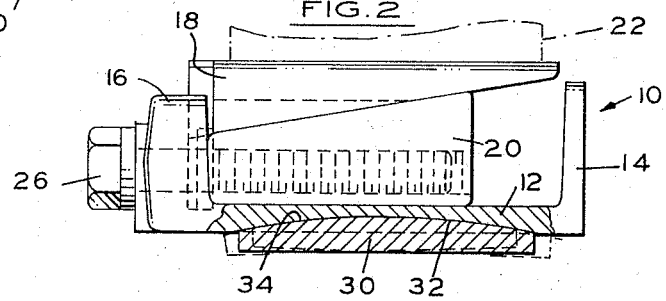
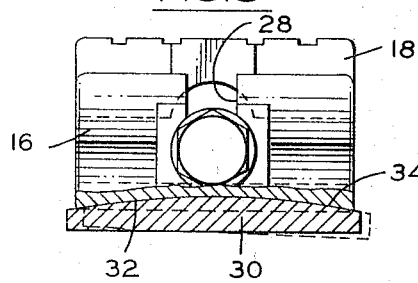
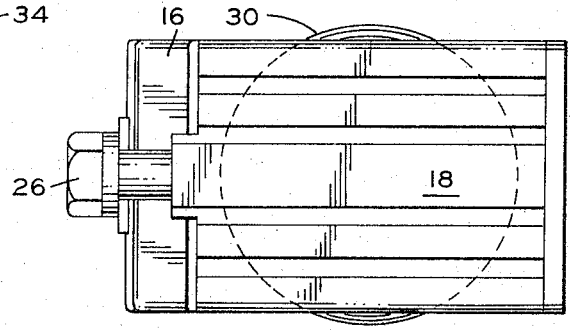
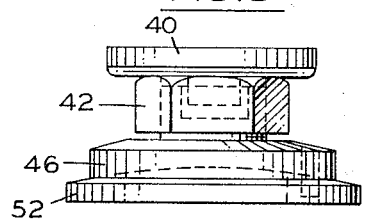
INVENTOR
J. PAUL A. BELLEFLEUR
BY
ATTORNEY Feb. 28, 1967  J. P. A. BELLEFLEUR  3,306,562
SELF-ALIGNING MACHINE LEVELERS
Filed Feb. 15, 1965  2 Sheets-Sheet 2
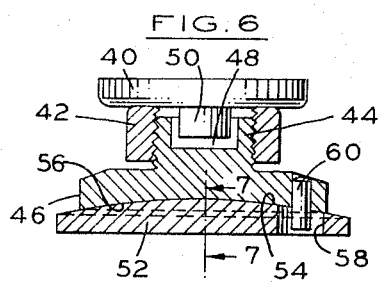
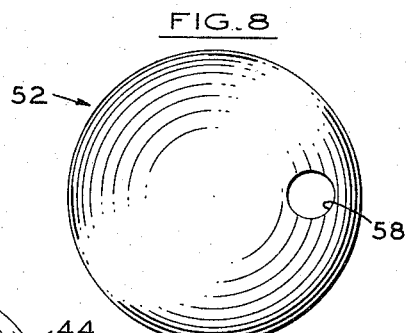
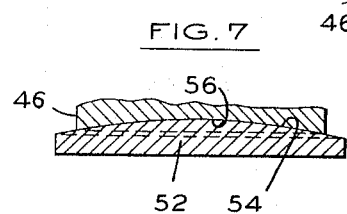
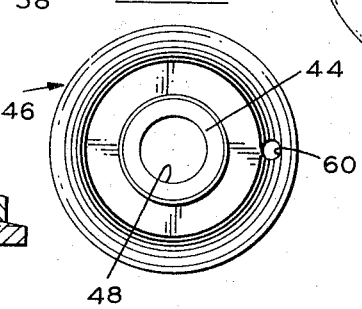
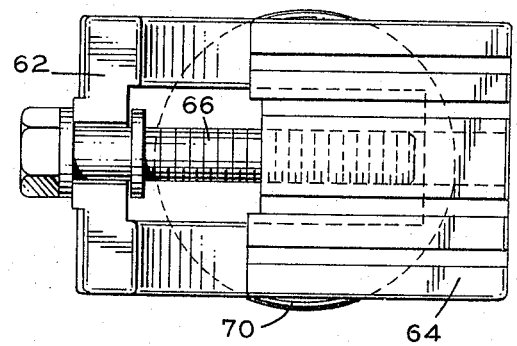
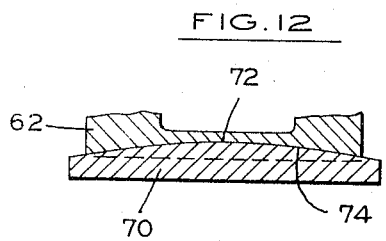
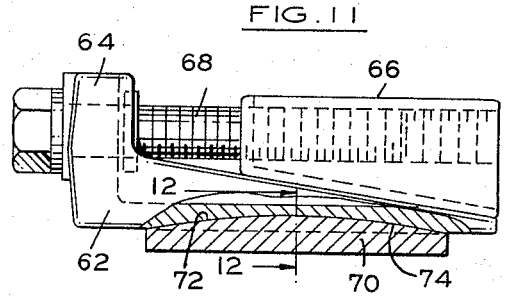
INVENTOR
J. PAUL A. BELLEFLEUR
BY
ATTORNEY

United States Patent Office 3,306,562
Patented Feb. 28, 1967

3,306,562
SELF-ALIGNING MACHINE LEVELERS
J. Paul A. Bellefleur, 24100 Sherman,
Oak Park, Mich. 48237
Filed Feb. 15, 1965, Ser. No. 432,563
6 Claims. (Cl. 248—188.2)

This invention relates to leveling devices or jacks and particularly to such devices for mounting and leveling heavy loads, regardless of the inclination of the structure or floor upon which the devices are supported.

Leveling devices have heretofore been employed for adjustably supporting heavy loads, such as machine tools, production equipment, large assembly fixtures, and the like, where the level condition of the load is highly critical. Usually several such levelers are used for supporting each load and are spatially disposed under the load. Each such leveler was adjustably elevated until the load was supported at the desired height and in level condition. Frequently the floors upon which such equipment or machines were mounted were not level, and by judicious adjustment of the leveler, the load supported thereby could be precision-levelled in spite of floor slant.

However, such leveling devices lacked the capacity for fully compensating for uneven or non-level floors or other supporting planes. Without careful compensation for floor inclination, the heavy loads carried would impose severe stresses on the leveling supports, producing unsuspected fractures in the leveling structures, resulting in a shifting or unleveling of the load and consequent impairment of the function of the load. This usually resulted in serious and costly consequences.

Partial attempts have been made to compensate for floor slope, including the provision of mating cylindrical surfaces, permitting one part of the leveling device to rotate slightly on a fixed axis to compensate for a non-level condition. This provision was only adequate if the direction of the floor slope was accurately determined and if the axis of these cylindrical surfaces was precisely oriented at right angles to the floor's inclination and maintained in such position throughout use.

An important object of the invention is to provide an improved leveling device which is so designed and constructed that severe stresses imposed by the load are avoided yet serving to achieve and maintain true level alignment of the supported load.

Another important object of the invention is to provide an improved leveling device which is self-aligning in any direction for automatically compensating for floor slope.

A further important object of the invention is to provide an improved leveling device for carrying heavy loads which is designed in a novel manner to compensate for floor inclination without any concern being made to the direction of the inclination.

Another important object of the invention is to provide an important leveling device for heavy loads which, the distribution of load weight over the whole supporting area, minimizes the shifting tendencies of the load usually caused by vibration.

Various other objects, advantages and meritorious features of this invention will become more fully apparent from the following specifications, appended claims and accompanying drawings wherein:

FIG. 1 is a perspective view of one form of leveling device embodying the invention;

FIG. 2 is a side elevation of the leveling device of FIG. 1 partially broken away to show a universal self-aligning base support for the device;

FIG. 3 is an end view of the device of FIG. 1 also partially broken away to show the base structure thereof;

FIG. 4 is a top plane view of the device of FIG. 1 showing by dotted outline the circular form of the universal self-aligning base portion thereof;

FIG. 5 is a side elevation of another form of a leveling device embodying the invention;

FIG. 6 is a vertical cross sectional view through substantially all of the device of FIG. 5;

FIG. 7 is a fragmentary vertical sectional view taken along line 7—7 of FIG. 6;

FIG. 8 is a slightly enlarged top plane view of the base member of the device illustrated in FIGS. 5, 6 and 7, showing its spherical convex contour;

FIG. 9 is a top view of the device of FIG. 5 with the lifting plate and adjusting nut removed;

FIG. 10 is a top plane view of another form of leveling device embodying the invention;

FIG. 11 is a side view of the device of FIG. 10 partially broken away to show the spherical mating surfaces of the base structure; and FIG. 12 is a fragmentary vertical cross sectional view taken along line 12—12 of FIG. 11 further showing the spherical mating surfaces of the base structure.

With particular reference to FIGS. 1 to 4, the embodiment of the invention disclosed therein comprises a frame member 10 of general U-shape formation including a bottom portion 12 and two opposite end wall portions 14 and 16. The cradle-like appearance of the frame member 10 forms a partial housing for a pair of superimposed wedge-shaped members, the upper one being indicated at 18 and serving as a lifting wedge and the lower one being indicated at 20 functioning as a sliding wedge. The lower wedge 20 is seated in the cradle of the frame member 10 and has a permitted lateral sliding movement on the bottom portion 12 in the direction of one or the other of the end walls 14 and 16. The upper wedge 18 has an overall length almost equal to the distance between the confronting surfaces of the end walls. The wedge is designed to nest within the end walls of the frame member 10 and to prevent sidewise movement of the wedge its central forepart is protruded as shown for vertical sliding movement.

The action of raising and lowering a load to a desired level line is achieved by converting lateral motion into vertical motion and particularly by the interaction of the inclined planes of the wedge members 18 and 20. This is accomplished by sliding movement of the lower wedge 20 toward either end wall 14 or 16 while the upper wedge is constrained from following this movement. Specifically, this operation is achieved by means of an adjusting screw 24 threadedly received in an internally threaded bore of the lower wedge and having an externally polygonally shaped head 26 which is engageable by a tool for turning purposes. The shank of the screw adjacent to the head is received in an upwardly opening slot of the frame wall 18. The wedge 20 has a relatively wide dimension as shown in FIG. 1, and the engagement of its flat under surface with the base portion 12 of the frame member serves to hold it from rotation when the screw is turned, thus resulting in the fore and aft movement of the lower wedge. Since the upper wedge is confined by the end walls 14 and 16 from following the movement of the lower wedge, it is moved vertically by the interaction of the inclined wedging surfaces and either upwardly or downwardly, depending on the direction of rotation of the screw.

A distinctive feature of the invention is the provision for compensating for any unevenness or slant of the supporting surface or floor upon which the leveling device is set. This is achieved by "floatingly" supporting the wedging members of the device for universal movement in any direction. For accomplishing this purpose, the device is provided with a base or aligning plate member 30 under the frame member 10 and providing mating spherical surfaces between the base member and the frame member. More specifically, and with particular reference to FIGS. 2 and 3, the aligning plate 30 is provided with an upwardly directed convex spherical protuberance 32 and the underside of the frame member 10 is provided with a concave spherical recess 34 of the same radius of curvature as the rounded projection 32.

The underside of the base or plate member 30, although circular in outline as evident in FIG. 4, is made flat for facial engagement with the usual supporting surface or floor upon which the leveler is located. When so laid on a floor, the base member will assume whatever inclination the floor has. The balance of the jack comprising the frame member 10 and wedges 18 and 20 is free to slide over the spherical surface 34 of the base plate in any direction as the heavy load carried thereby is vertically adjusted and levelled. Any slant in the floor within the capability of the leveling assembly can be readily compensated for in this manner. Several positions of the base member 30 relative to the balance of the device are shown in dotted outline in FIGS. 2 and 3. The degree and direction of floor slant for these positions is represented by the dotted underside of the base member.

In carrying out its function, the heavy load supported by each leveling device constructed in accordance with this invention is spread or distributed equally over the wide surface area of the spherical portions 32 and 34 and thereby avoiding the concentration of the load at any low spot or line which might easily cause a fracture of one of the parts of the leveling jack. Moreover, no care need be exercised about the direction of the floor slant and the disposition of the parts of the jack with respect thereto. During the operation of vertically adjusting and leveling the load, the frame member 10 and the wedging members contained therein may be slid and swivelled over the spherical protuberance 32 of the base member regardless of the direction of the floor slant.

FIGS. 5 to 9 inclusive disclose the application of the invention to a screw type of load leveller which employs a vertically extending threaded member, as contrasted with the leveling device of FIGS. 1 to 4, having an adjusting nut for providing the lifting force. The make-up of the parts of this assembly is probably best illustrated in FIG. 6 wherein a load supporting lifting plate 40 is carried on a ring-shaped member in the form of an adjusting nut 42 having a polygonal exterior for engagement by a wrench or like turning tool. The nut 42 is internally threaded with a fine pitch for engagement with an externally threaded stud 44 of like pitch. As illustrated, the stud 44 forms a central integral part of a wide structural member 46 which is capable of universal displacement within limits in any direction as hereinafter described. It is evident that upon rotation of the nut in one direction it will rise on the threads against the lifting plate 40 and cause it and the load thereon to move in a smooth vertical direction. Contrarotation of the nut will cause it to travel down the stud thereby lowering the plate and the load carried thereby. In order to maintain the plate and relatively centered position on the nut, the stud is provided with an upwardly opening circular recess 48 into which a downwardly extending cylindrical extension 50 from the plate loosely fits.

Underneath member 46 and supporting the same is an aligning base plate 52. As in the previously described embodiment of the invention, these two members are shaped to provide adequate universal movement in any direction relative to one or another and to employ this facility to compensate for any inclination of the supporting surface or floor upon which the leveling device is located. As in the previously described embodiment, the engaging surfaces of the two members assume complementary spherical contours of the same radii. The base plate 52 is provided with a spherical protuberance 54 which is received in a spherical concavity 56 on the underside of the member 46. FIGS. 6 and 7 illustrate preferred dimensioned characteristics for the two members 46 and 52 and their mating spherical surfaces.

When the adjusting nut 42 is turned it is necessary to hold the stud 44 and associated base portion 46 from rotation yet provide the desired universal movement to compensate for floor slant. This is preferably accomplished by providing a relatively large hole 58 in the base plate 52 as shown in FIG. 6 into which is received a pin 60 fixed to and depending from the member 46. The pin 60 is cylindrical and of comparatively small diameter as measured against the diameter of the hole 58, thus allowing permitted limited movement of the member 46 and the parts carried thereby over the spherical surface 54 to compensate for the inclination of the floor but restricting any serious degree of rotation of the member 46 when the nut is turned. Accordingly, the embodiment of FIGS. 5 to 9 provides a sturdy leveling device for heavy loads having a base provision for providing limited universal movement of its upper structure and for spreading the load over a relatively wide surface area in any position assumed by the upper structure.

The embodiment of the invention illustrated in FIGS. 10, 11 and 12 incorporates the same self-aligning principles heretofore described but applied to a leveling device designed for light to medium heavy loads. In this design, two wedge members 62 and 66 are utilized which are similar in function to the previously described wedge members 18 and 20. The top wedge member 66 is caused to move up or down by the interaction of its incline plane with the incline plane of the bottom wedge member 62. To achieve this motion, a hexagon headed screw 68 is provided which extends through the front upright portion 64 of the lower wedge member as in the device illustrated in FIGS. 1 to 4. However, in the instant embodiment, the upper wedge member will move laterally under the load which it supports and therefore is provided with smooth slipways permitting it to glide under the load while imparting the up or down motion according to the direction of turn of the screw 68.

As in the previously described embodiments of the invention, the device of FIGS. 10, 11 and 12 is constructed for universal movement to assume different inclinations and it achieves this capability by the provision of mating spherical surfaces. As shown in FIGS. 11 and 12 there is provided a base plate 70 under the wedge member 62 having a convex spherical surface 72 which is received in a concave spherical recess 74 on the underside of member 62. As in the previously described embodiments hereinabove, the spherical surfaces 72 and 74 are of the same spherical radius and are thus in surface contact with one another throughout their extent, thereby distributing the supported load over a relatively wide surface area.

In the three embodiments of the invention as illustrated and described herein, it is apparent that the area of the spherical surfaces approximates the width of each design and that the spherical radius is substantially greater than any dimension of the devices. It is preferred that the radius of the spherical surfaces be approximately 12½ inches and that the area of these surfaces occupy a substantial part of the device. In this manner, each device may accommodate an off level floor condition up to 9° and yet provide a strong, durable precisely aligned support under all environmental conditions including vibrations of the machine or other load supported thereby.

While preferred embodiments of the invention have been described and illustrated, it is to be understood that they are capable of variation and modification without departing from the spirit and scope of the invention.

What is claimed is:

1. A leveling device for mounting and leveling heavy loads including, in combination, a pair of members having engaging inclined surfaces such that upon movement of one relative to the other the combined height of the two members is varied, and means for providing lateral and angular adjustment of the device for compensating for the inclination of the floor upon which it is mounted including a floor engaging base member having a spherical surface portion mating with a spherical surface portion on the underside of the device, the two surface portions serving to support the load yet providing shiftable movement of the height varying members in any direction on the curved contour represented by the mating spherical surfaces for leveling the device and the load supported thereby regardless of the slant of the floor.

2. A leveling device for mounting and leveling heavy loads including, in combination, a pair of members having means threadedly engaging one another such that upon rotation of one relative to the other the combined height of the two members is varied, means for providing adjustment of the device in order to compensate for the inclination of the floor upon which it is mounted including a floor engaging base member having a spherical surface portion mating with a spherical surface portion on the underside of the immediate adjacent threaded member of the device, the two surface portions serving to support the load yet providing shiftable movement of the threadedly engaged members in any direction on the curved contour represented by the mating spherical surfaces for leveling the device and the load supported thereby regardless of the slant of the floor, and a pin fixed to and protruding from one of the spherical surfaces and extending into a hole in the other spherical surface, the hole being oversized the pin and permitting the shiftable movement of the threadedly engaged members yet preventing rotation of the immediate adjacent threaded member.

3. A leveling device for supporting and leveling heavy loads regardless of floor slant comprising, in combination, a first wedge member having an upwardly facing flat inclined surface, a second wedge member superimposing the first member and having a flat inclined surface on the underside thereof in load bearing facial engagement with the inclined surface of the first wedge member, a screw member internally threaded in one of said wedge members and having a head for anchoring the screw member against longitudinal movement at least in one direction, said screw member being operable upon rotation in either direction for laterally adjusting one of the wedge members relative to the other to alter the combined height of the two wedge members and thus adjusting the height of a load supported thereby, and a third member in aligned load bearing relation with the two wedge members having a spherical surface mating with a spherical surface formed on one of the wedge members, the radius of curvature of the two spherical surfaces being the same and being substantially greater than any lateral dimension of the device.

4. A leveling device for mounting and leveling heavy loads regardless of the direction of floor slant comprising, in combination, a pair of wedge members in superimposing relation to ane another and having mating inclined surfaces, a screw member internally threaded in one of the members and operable upon rotation for laterally adjusting this member relative to the other to alter the combined height of the two wedge members and thus adjusting the height of a load supported thereby, and a third member positioned in load bearing alignment with the two wedge members, said third member having a convex spherical projection and one of said two wedge members having a concave spherical recess of substantially the same radius of curvature as said convex projection and receiving the same, the sperical surfaces of said projection and said recess being in load supporting facial contact and permitting laterally slidable adjustment of two wedge members in order to compensate for the floor slant upon which the device is mounted, and the radius of curvature of the spherical surfaces being substantially greater than any lateral dimension of the device.

5. A leveling device for supporting and leveling heavy loads regardless of floor slant comprising, in combination, a first wedge member having an upwardly facing inclined surface, a second wedge member superimposing the first member and having a flat inclined surface on the underside thereof in load bearing facial engagement with the inclined surface of the first wedge member, a third frame member underlying the wedge members and serving as a support therefor, said frame member having opposite side wall portions cradling the wedge members and serving as a stop limiting lateral travel of the wedge members, a screw member internally threaded in one of the wedge members and having a head anchored on one of the wall portions of the frame member, said screw member being operable upon rotation in either direction for laterally adjusting the wedge member with which it is threadedly engaged relative to the other wedge member thereby to alter the combined height thereof and to adjust the height of a load supported thereby, and a fourth member in aligned load bearing relation to the other three members and having a spherical surface mating with a spherical surface formed on one of the outermost of the other three members, the radius of curvature of the two spherical surfaces being the same and being substantially greater than any lateral dimension of the device.

6. A leveling device for mounting and leveling heavy loads including, in combination, a supporting frame member having a horizontal base and at least one vertical upright that is integral therewith, a first wedge shaped member slidably supported on the base for rectilinear movement thereof, said first member having an upper surface that is disposed at an incline with respect to the base, a second wedge shaped member having a lower inclined surface slidably engaging the inclined surface of the first member, and means for providing lateral and angular adjustment of the device for compensating for the inclination of the floor upon which it is mounted, said means comprising an aligning plate disposed in load bearing relation to the first three members of the device and having a spherical surface portion thereon mating with a spherical surface portion on one of the outermost of the other members, the two spherical surface portions serving to support the load yet providing shiftable movement of the load bearing members in any direction on the curved contour made by the spherical surfaces for leveling the device and the load supported thereby regardless of the slant of the floor.

References Cited by the Examiner
UNITED STATES PATENTS 156,927 11/1874 Jewell _____ 248—188.4
1,987,726 1/1935 Wilkerson _____ 248—23

CLAUDE A. LE ROY, *Primary Examiner.*

J. F. FOSS, *Assistant Examiner.*